United States Patent
Smith (10) Patent No.: US 9,903,700 B2
(45) Date of Patent: Feb. 27, 2018

(54) PROBE ALIGNMENT FIXTURE AND METHOD

(71) Applicant: Moog Inc., East Aurora, NY (US)

(72) Inventor: Andrew H. Smith, Alden, NY (US)

(73) Assignee: Moog Inc., East Aurora, NY (US)

( * ) Notice: Subject to any disclaimer, the term of this patent is extended or adjusted under 35 U.S.C. 154(b) by 233 days.

(21) Appl. No.: 14/987,225

(22) Filed: Jan. 4, 2016

(65) Prior Publication Data

US 2016/0195383 A1    Jul. 7, 2016

Related U.S. Application Data

(60) Provisional application No. 62/100,680, filed on Jan. 7, 2015.

(51) Int. Cl.
| | | |
|---|---|---|
| G01B 5/012 | (2006.01) | |
| G01D 18/00 | (2006.01) | |
| G01B 21/04 | (2006.01) | |

(52) U.S. Cl.
CPC ........... *G01B 5/012* (2013.01); *G01B 21/042* (2013.01); *G01D 18/00* (2013.01)

(58) Field of Classification Search
CPC ....... G01B 5/012; G01B 21/042; G01D 18/00
USPC .... 33/502, 503, 556, 557, 559, 560; 73/1.79
See application file for complete search history.

(56) References Cited

U.S. PATENT DOCUMENTS

| | | | | |
|---|---|---|---|---|
| 4,510,693 A | * | 4/1985 | Cusack ................. | G01B 5/012 33/558 |
| 4,693,110 A | * | 9/1987 | Juengel ................ | B23Q 1/0009 33/502 |
| 5,195,826 A | * | 3/1993 | Enderle ................ | G01B 5/0014 33/560 |
| 5,251,156 A | * | 10/1993 | Heier ................... | G01B 11/005 33/503 |
| 5,259,119 A | * | 11/1993 | Yoshioka ............. | G01B 5/12 33/502 |
| 5,341,574 A | * | 8/1994 | Bieg .................... | G01B 21/042 33/502 |
| 5,404,649 A | * | 4/1995 | Hajdukiewicz ...... | B23Q 5/58 33/503 |

(Continued)

OTHER PUBLICATIONS

Q-Mark Manufacturing Inc., CMM Stylus Catalog, Apr. 2013, Cube Squared, p. 56.

(Continued)

*Primary Examiner* — Christopher Fulton
(74) *Attorney, Agent, or Firm* — Hodgson Russ LLP (57) ABSTRACT

A fixture enables a stylus extension to be angularly aligned relative to an adapter plate that mounts onto a CMM probe head. Alignment may be carried out on a flat surface remotely from the CMM. The adapter plate is mounted to the fixture, which includes an access hole providing access to adjustment screws at the rear of the adapter plate. One or more lateral extensions are connected to the stylus extension to define a calibration axis perpendicular to a probe axis of the stylus extension and perpendicular to a central axis of the adapter plate about which angular alignment is desired. Angular adjustments of the stylus extension are made while the adapter plate is mounted to the fixture, and a degree to which the calibration axis is parallel to a plane of the flat surface is detected, for example using a dial indicator engaging points on the lateral extension(s).

13 Claims, 9 Drawing Sheets

(56) References Cited

U.S. PATENT DOCUMENTS

| | | | | |
|---|---|---|---|---|
| 5,918,378 | A | * | 7/1999 | McMurtry ............ G01B 7/012 33/556 |
| 6,112,423 | A | * | 9/2000 | Sheehan ............. G01B 21/042 33/502 |
| 6,198,298 | B1 | * | 3/2001 | Nishioki ................ G01B 5/012 324/754.1 |
| 6,430,828 | B1 | * | 8/2002 | Ulbrich ................. G01B 7/012 33/503 |
| 8,402,668 | B2 | | 3/2013 | Osterstock et al. |
| 9,212,887 | B2 | * | 12/2015 | Yamane ................ G01B 5/004 |
| 2006/0191149 | A1 | * | 8/2006 | Banks ................... G01B 5/008 33/502 |
| 2013/0247402 | A1 | | 9/2013 | Richter |

OTHER PUBLICATIONS

Carl Zeiss Industrial Metrology, on-line catalog listing for FixAssist Set-up Device, https://us.probes.zeiss.com/en/ZEISS-Innovations/Fix Assist, Aug. 15, 2014.

* cited by examiner

PROBE ALIGNMENT FIXTURE AND METHOD

FIELD OF THE INVENTION

The present invention relates generally to the field of coordinate measuring machines, and more particularly to the problem of angularly aligning a stylus extension relative to an adapter plate that mounts the stylus extension onto a probe head of a coordinate measurement machine.

BACKGROUND OF THE INVENTION

A coordinate measuring machine (CMM) is a computer-controlled device for measuring the geometrical dimensions of an object. Object geometric features are measured using a probe moved by the machine in X, Y, and Z spatial coordinate axes. The probe, also referred to as a stylus, may be brought into contact with the object to obtain a measurement of physical coordinates at a point of contact. Bridge-type CMMs commonly have a granite table defining an X-Y plane, a gantry mechanism supported by a pair of vertical legs to extend transversely over the table, and a probe head extending downward from the gantry. The probe head is movable transversely along the gantry in opposite X-axis directions. The gantry with the probe head is movable forward and backward along the length of the table in opposite Y-axis directions. The probe head is also moveable vertically up and down relative to the gantry and table surface in opposite Z-axis directions. In some CMM designs, the probe head may be provided with one or more rotational degrees of freedom in addition to the X-Y-Z motion capability.

The stylus may be mounted onto the probe head by an adapter plate. The stylus may be coupled to the adapter plate through an assembly of one or more rigid extension arms configured so that the stylus can reach features of interest on the object that is being measured. The adapter plate may be mounted onto the probe head of the CMM in a manner allowing the CMM to swap among different adapter plates having different stylus arm configurations. For example, as will be understood by persons familiar with CMMs, the adapter plate may be mounted onto the probe head of the CMM by means of an electromagnet, and a rack holding several adapter plates each with a different stylus configuration is accessible to the probe, whereby an adapter plate on the probe head may be deposited in an open space in the rack by de-energizing the electromagnet, and a different adapter plate may be mounted onto the probe head by positioning the probe head over the desired adapter plate and energizing the electromagnet.

Figure 1A:
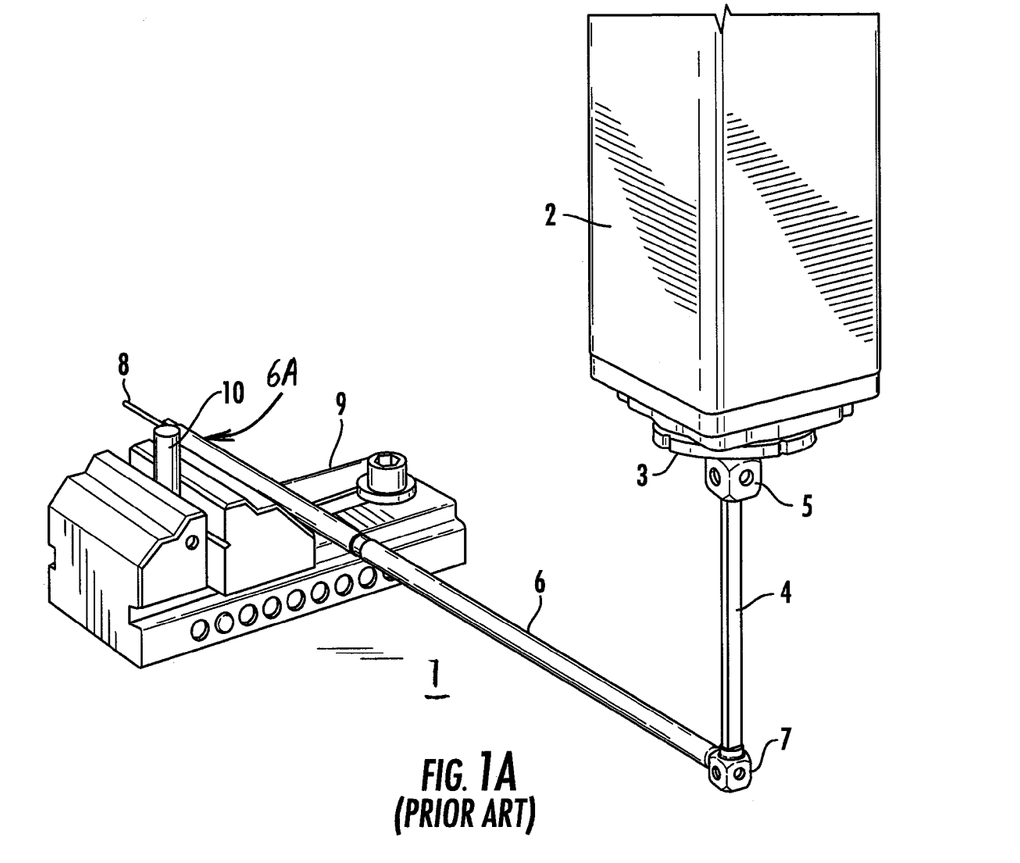
FIGS. 1A and 1B are perspective views illustrating a prior art method of angularly aligning a stylus extension relative to an adapter plate mounted onto a probe head of a coordinate measurement machine.
Figure 1B:
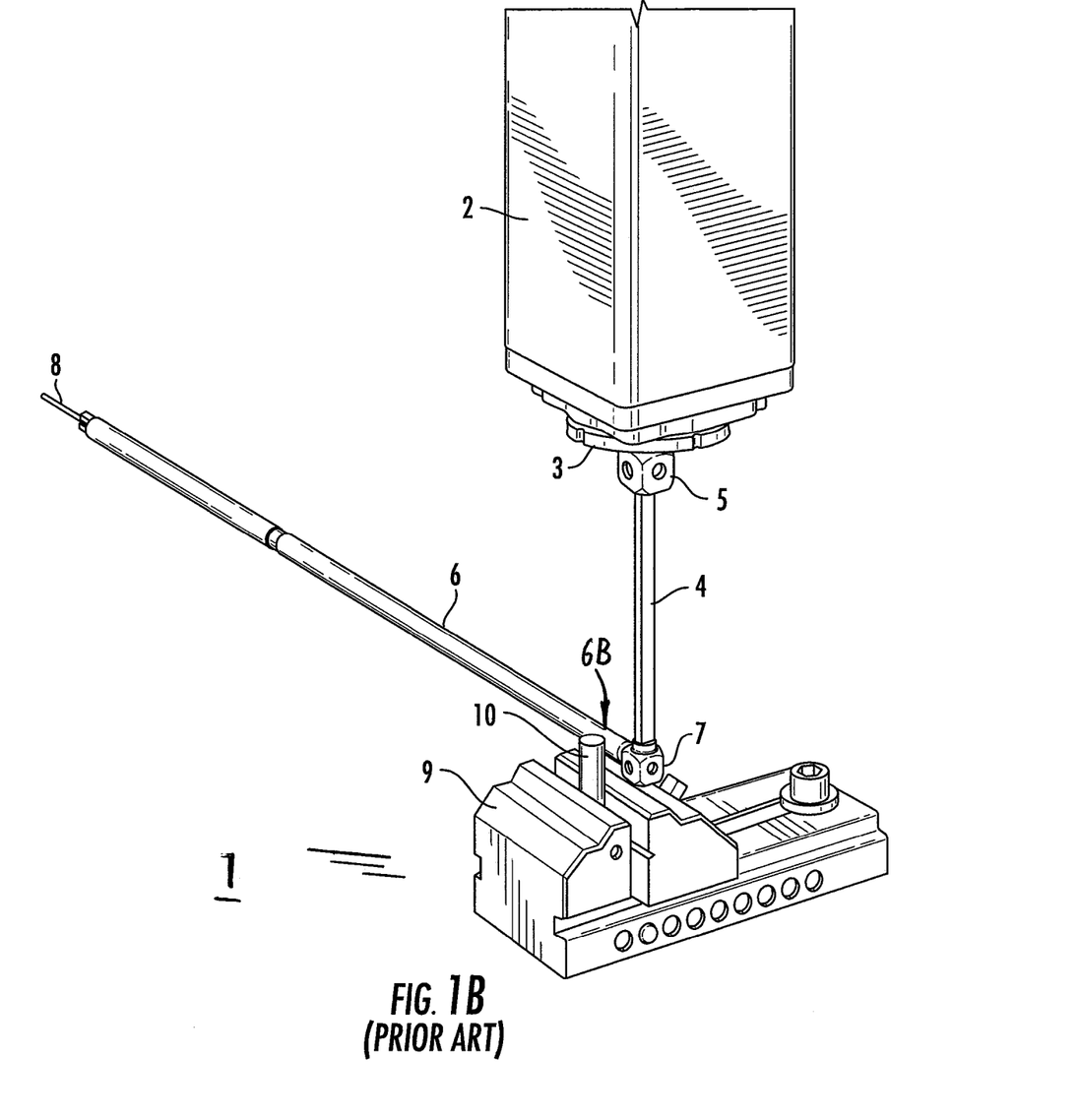

A common arrangement is depicted in FIGS. 1A and 1B, wherein a CMM probe head 2 has an adapter plate 3 mounted thereon such that a central axis of the adapter plate coincides with a vertical Z-axis along which probe head 2 travels. A rigid plate extension 4 is coupled to adapter plate 3 by a first coupling cube 5 to extend downward in the Z-axis direction toward a table surface 1 of the CMM. A rigid stylus extension 6 is coupled to a distal end of plate extension 4 by a second coupling cube 7 such that the stylus extension extends in an X-Y plane of the CMM parallel to table surface 1. A contact stylus 8 is carried at a distal end of stylus extension 6. The first coupling cube 5 is releasably clamped on adapter plate 3 so that its angular orientation relative to the adapter plate about the central axis of the adapter plate is adjustable. In a known arrangement, several adjustment screws on a rear side of the adapter plate may be loosened to permit angular adjustment and then tightened to secure the first coupling cube 5 in a chosen angular orientation. As will be apparent, this permits angular adjustment of the entire stylus assembly connected to coupling cube 5, including plate extension 4, second coupling cube 7, stylus extension 6, and contact stylus 8. Thus, the stylus extension 6 and contact stylus 8 may be orientated in any direction in the X-Y plane depending upon the angular orientation of the first coupling cube 5 relative to the adapter plate.

Before taking measurements with the CMM, it may be necessary to calibrate the CMM by angularly aligning stylus extension 6 relative to adapter plate 3 such that the stylus extension 6 extends along one of the horizontal axes of the CMM, for example the Y-axis along which the gantry travels. Further reference is made now to FIGS. 1A and 1B to describe a known prior art method of angularly aligning a stylus extension relative to an adapter plate. As mentioned above, stylus extension 6 is angularly adjustable about a central axis of adapter plate 3 coinciding with the vertical Z-axis of probe head 2. To perform such an adjustment, adapter plate 3 is removed from probe head 2, and the adjustment screws at the rear of adapter plate 3 are loosened to permit rotation of first coupling cube 5 and the depending structure relative to adapter plate 3. With the screws loosened, the stylus assembly—i.e. first coupling cube 5, plate extension 4, second coupling cube 7, stylus extension 6, and stylus 8—is rotated as a unit about the central axis of adapter plate 3 to a new angular position. Once a desired angular position is reached, the adjustment screws are tightened to fixedly secure the rotated stylus assembly relative to adapter plate 3.

In the example illustrated in FIGS. 1A and 1B, the goal is to align stylus extension 6 to extend solely along a Y-axis direction. To determine the extent to which stylus extension 6 varies from the desired alignment direction, a vice 9 is situated at a set position on table surface 1 and a gauge pin 10 is clamped in vice 9 to provide a fixed (stationary) reference location. The CMM is operated to move probe head 2 to bring a distal end portion 6A of stylus extension 6 into contact with gauge pin 10 as shown in FIG. 1A, whereby the CMM can obtain a first spatial data point comprising X, Y, and Z axis coordinates. The CMM is also operated to move probe head 2 to bring a proximal end portion 6B of stylus extension 6 into contact with gauge pin 10 as shown in FIG. 1B, whereby the CMM can obtain a second spatial data point comprising X, Y, and Z axis coordinates. By comparing the X and Y coordinates of the first spatial data point to the X and Y coordinates of the second spatial data point, an indication of alignment may be ascertained. For example, if the difference between the two measured X coordinates is less than or equal to 0.001 inches per inch of extension along the Y-axis, then alignment of stylus extension 6 may be deemed acceptable. If not, an angular adjustment procedure must be carried out as described in the preceding paragraph, and then the CMM must be operated to check the alignment again as described in this paragraph. This procedure must be repeated until an acceptable alignment is achieved. It is not uncommon to repeat these steps as many as five times or more to achieve an acceptable alignment calibration.

As is understood by CMM operators, this process is extremely time consuming, sometimes taking hours to complete, and depends upon the skill and experience of the operator. A more efficient solution is needed.

SUMMARY OF THE INVENTION

The invention provides an apparatus and a corresponding method for angularly aligning a stylus extension relative to an adapter plate configured to mount onto a probe head of a CMM. The stylus extension is connected to the adapter plate such that the stylus extension extends along a probe axis that is perpendicular to a central axis of the adapter plate. Angular alignment of the stylus extension about the central axis of the adapter plate may be performed efficiently using the apparatus and method of the invention, without occupying or operating the CMM.

The apparatus of the invention comprises a fixture including a front mounting surface, a rear clamping surface opposite from the front mounting surface, and a front clamping surface in a plane parallel to the front mounting surface. The front clamping surface is offset from the front mounting surface by an axial step distance corresponding to an axial thickness of the adapter plate. The fixture also includes an access hole extending through the fixture from the front mounting surface to the rear clamping surface, and a plurality of angularly spaced mounting features in the front mounting surface for respectively receiving mounting elements of the adapter plate. The adapter plate is mountable against the front mounting surface of the fixture such that the central axis of the adapter plate extends through the access hole. The access hole permits a user to loosen and tighten adjustment screws at the rear of the adapter plate to adjust the angular orientation of the stylus extension about the central axis of the adapter plate. The fixture may be formed as a one-piece body.

The apparatus may additionally comprise a vice operable to clamp the adapter plate against the front mounting surface of the fixture. The vice includes a front jaw for engaging the adapter plate and the front clamping surface of the fixture, and a rear jaw for engaging the rear clamping surface of the fixture. The rear jaw of the vice is configured to leave the access hole of the fixture substantially unblocked when the fixture and the adapter plate are clamped in the vice so that the adjustment screws remain accessible.

The method of the invention may comprise the steps of providing a fixture separate from the probe head, mounting the adapter plate to the fixture, and connecting at least one lateral extension to the stylus extension such that the lateral extension extends in a lateral direction from the stylus extension along a calibration axis perpendicular to the probe axis and the central axis. The method may further comprise adjusting the angular position of the stylus extension about the central axis of the adapter plate while the adapter plate is mounted to the fixture, setting the fixture relative to a flat surface such that the central axis extends parallel to a surface plane defined by the flat surface, and detecting a degree to which the calibration axis is parallel to the surface plane, wherein these further steps are repeated if the calibration axis is not parallel to the surface plane within acceptable limits. In a specific embodiment of the invention, the adapter plate may be mounted to the fixture by clamping the adapter plate to the fixture with a vice, and a dial indicator may be used to check the orientation of the calibration axis relative to the plane of the flat surface.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Reference is now made to FIGS. 2A through 8B. The present invention provides an alignment calibration apparatus and corresponding method useful for angularly aligning a stylus extension relative to an adapter plate configured to mount onto a probe head of a coordinate measurement machine.

In an embodiment of the present invention, the alignment calibration apparatus comprises a fixture 20 on which an adapter plate 3 is removably mounted, wherein the fixture 20 is configured to allow angular adjustment and alignment to be carried out without the need to repeatedly mount adapter plate 3 on CMM probe head 2, remove it from the probe head for adjustment, and re-mount it on the probe head.

Figure 3:
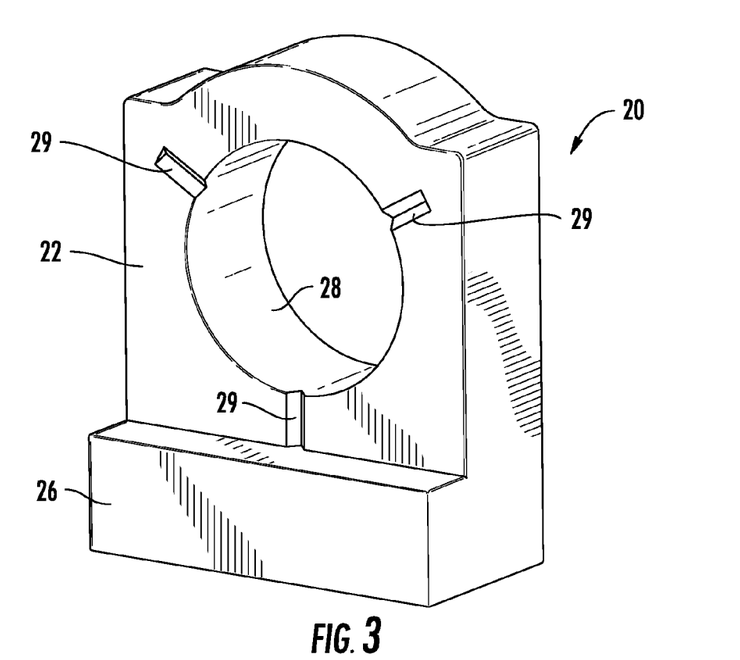
FIG. 3 is a front perspective view of a calibration fixture formed in accordance with an embodiment of the present invention.
Figure 4:
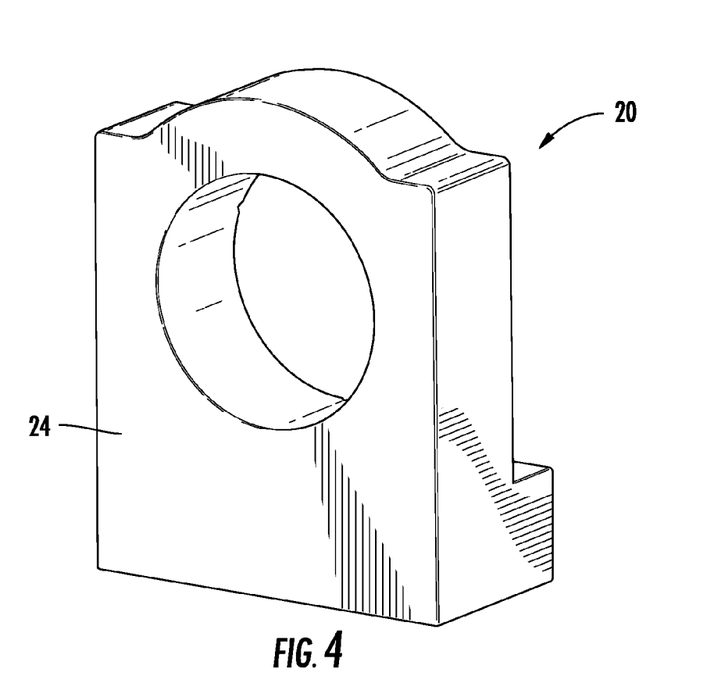
FIG. 4 is a rear perspective view of the fixture shown in FIG. 3.
Figure 5:
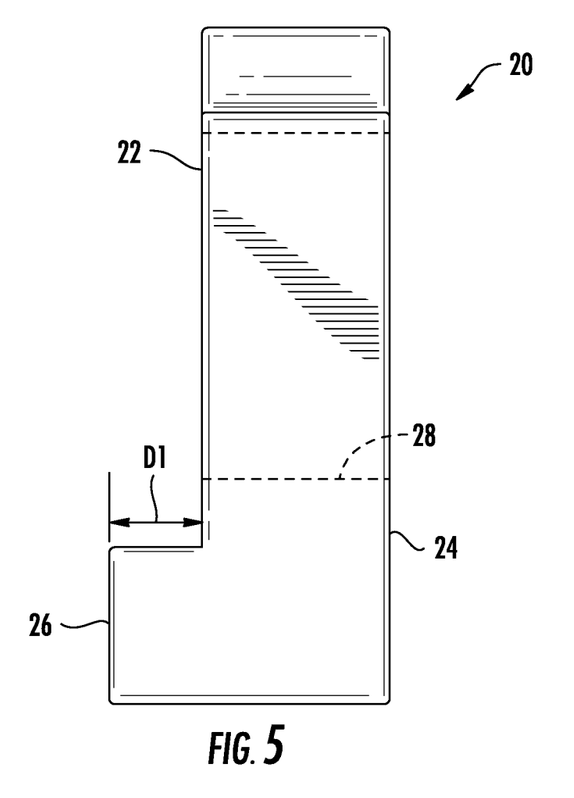
FIG. 5 is a side elevation view of the fixture shown in FIG. 3.

Fixture 20 formed in accordance with an embodiment of the invention is shown in isolation in FIGS. 3 through 5. Fixture 20 comprises a front mounting surface 22, a rear clamping surface 24 opposite from the front mounting surface, and a front clamping surface 26 in a plane parallel to the front mounting surface. Front clamping surface 26 is offset from front mounting surface 22 by an axial step distance D1 corresponding to an axial thickness of an adapter plate 3 that fixture 20 is configured to receive.

Figures 2A, 2B:
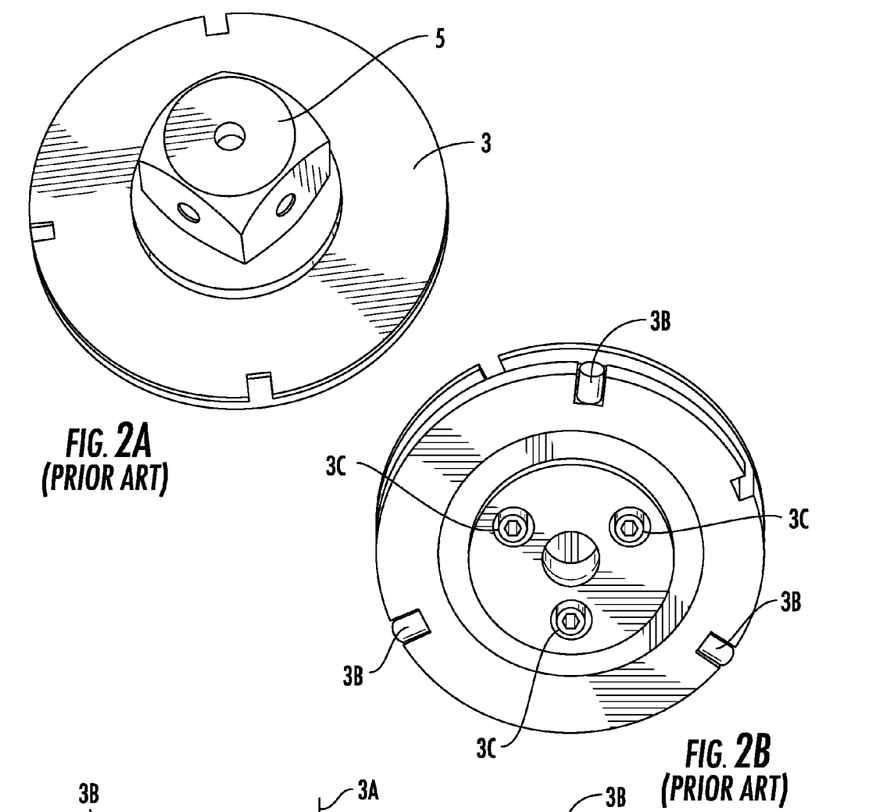
FIG. 2A is a front perspective view of an adapter plate and attached coupling cube of the prior art.
FIG. 2B is a rear perspective view of the adapter plate and coupling cube shown in FIG. 2A.
Figure 2C:
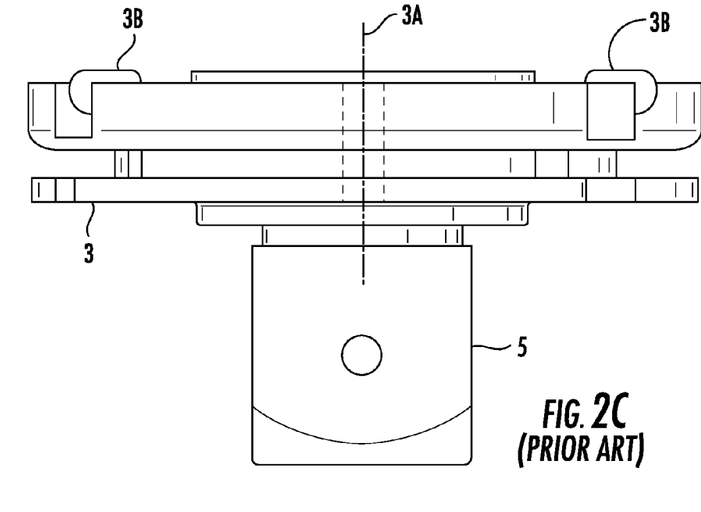
FIG. 2C is an elevational view of the adapter plate and coupling cube shown in FIG. 2A.

Fixture 20 includes an access hole 28 extending through the fixture from front mounting surface 22 to rear clamping surface 24, and a plurality of angularly spaced mounting features 29 in front mounting surface 22 for respectively receiving corresponding mounting elements of adapter plate 3. For example, as shown in FIGS. 2A through 2C, adapter plate 3 may include a plurality of radially extending cylindrical elements 3B arranged at angular intervals about a central axis 3A of the adapter plate. Thus, in the current embodiment, mounting features 29 may be in the form of radially extending V-shaped grooves sized to receive cylindrical elements 3B. Front mounting surface 22 of fixture 20 may mimic the bottom mounting surface of probe head 2.

Figure 6:
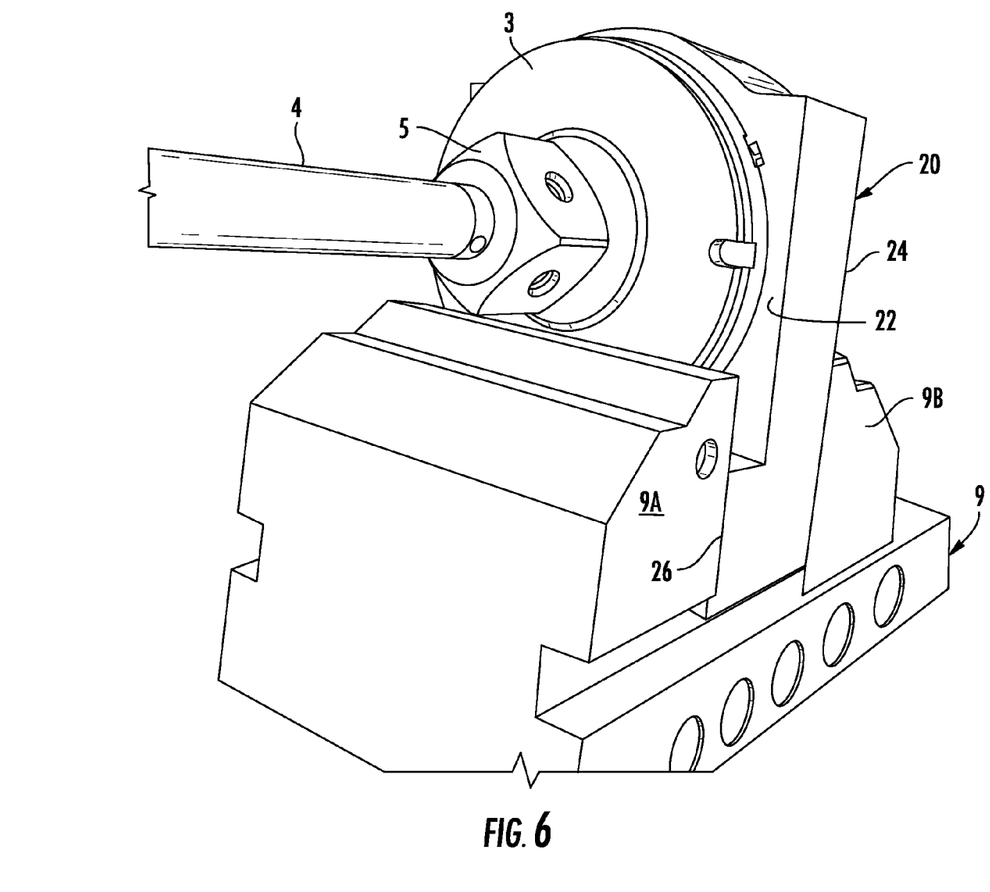
FIG. 6 is a front perspective view showing an adapter plate clamped to the fixture.
Figure 7:
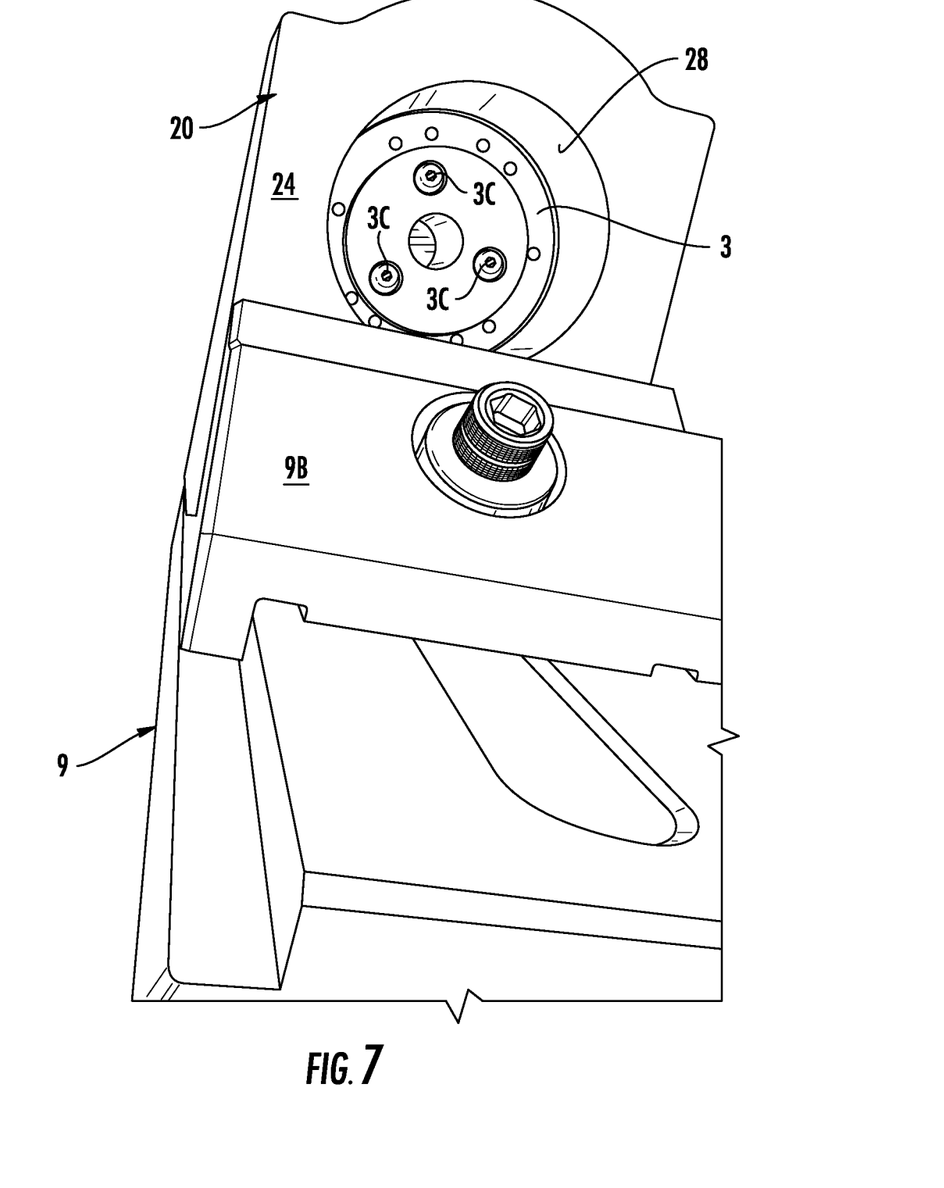
FIG. 7 is a rear perspective view showing an adapter plate clamped to the fixture.

As may be understood with reference to FIGS. 6 and 7, adapter plate 3 is mountable against front mounting surface 22 of fixture 20 such that the central axis 3A of the adapter plate extends through access hole 28. In one embodiment, adapter plate 3, along with the stylus assembly connected to it, may be clamped against front mounting surface 22 by a vice 9. In the depicted embodiment, vice 9 includes a front jaw 9A for engaging adapter plate 3 and front clamping surface 26 of fixture 20 and a rear jaw 9B for engaging rear clamping surface 24 of fixture 20, wherein the rear jaw 9B is configured to leave the access hole 28 of the fixture substantially unblocked when the fixture and the adapter plate are clamped in the vice. Thus, as best seen in FIG. 7, a plurality of adjustment screws 3C at the rear of adapter plate 3 are accessible and adjustable through access hole 28 while adapter plate 3 is clamped to fixture 20 by vice 9.

Fixture 20 may be a one-piece body. For example, fixture 20 may be a molded one-piece body, may be built as a one-piece body by additive manufacturing, or may be machined from a one-piece block of material (i.e. subtractive manufacturing). A durable, rigid material may be used to manufacture fixture 20. Some examples of suitable materials include, without limitation, polycarbonate, ABS plastics, and aluminum.

In the current embodiment, vice 9 is used to clamp adapter plate 3 to fixture 20, and may be considered a component of an alignment calibration apparatus of the present invention in combination with fixture 20. Other means of holding adapter plate 3 in position against front mounting surface 22 of fixture 20 are possible, including a clamping mechanism integrated into fixture 20. Use of vice 9 for this purpose is advantageous because such vices are standard equipment in CMM work areas, and fixture 20 may be made as a simple, one-piece unit having no relatively moving parts.

A method of angularly aligning stylus extension 6 relative to adapter plate 3 in accordance with an embodiment of the present invention will now be described with reference to FIGS. 6, 7, 8A and 8B. Adapter plate 3 is removed from probe head 2 and mounted to fixture 20. In the illustrated embodiment, adapter plate 3 may be mounted to fixture 20 using vice 9, wherein the jaws of the vice are arranged such that adjustment screws 3C are accessible and adjustable through access hole 28 while the adapter plate is clamped to the fixture. The stylus assembly including stylus extension 6 is connected to adapter plate 3, either before or after the adapter is mounted to fixture 20, such that stylus extension 6 extends along a probe axis PA that is perpendicular to central axis 3A of adapter plate 3. A first lateral extension 35 and a second lateral extension 37 are connected to stylus extension 6, for example through second coupling cube 7, such that the first and second lateral extensions extend in opposite lateral directions from stylus extension 6 along a calibration axis CA that is perpendicular to both probe axis PA and central axis 3A of adapter plate 3.

Figure 8A:
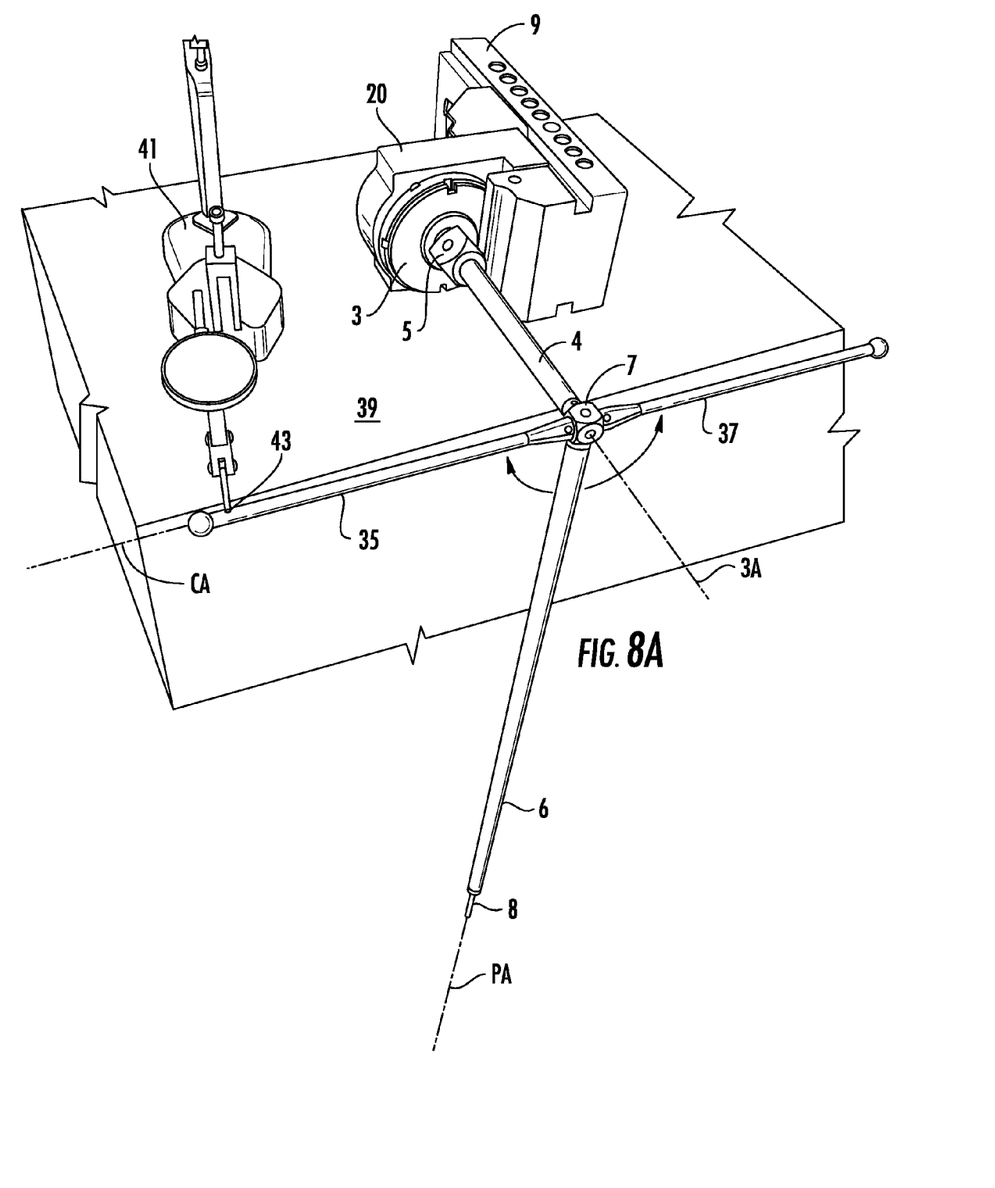
FIGS. 8A and 8B are perspective views illustrating a novel method of angularly aligning a stylus extension relative to an adapter plate configured to mount onto a probe head of a coordinate measurement machine in accordance with an embodiment of the present invention.
Figure 8B:
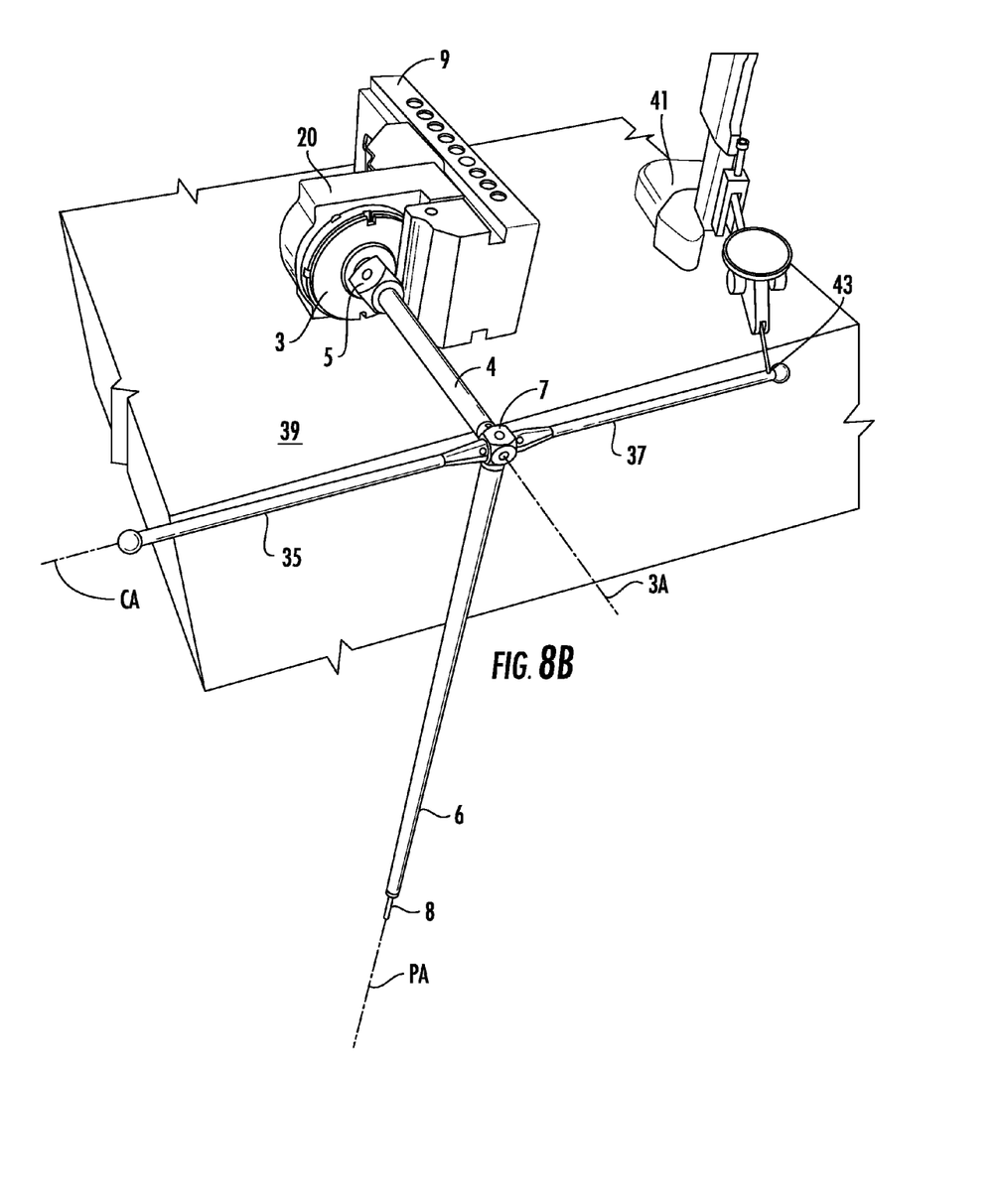

While adapter plate 3 is mounted to fixture 20, the angular position of stylus extension 6 about central axis 3A is adjusted. Adjustment may be carried out by loosening adjustment screws 3C, rotating stylus extension 6 (together with other members of the stylus assembly) relative to the adapter plate 3 about central axis 3A to a chosen angular setting position, and then tightening adjustment screws 3C to fix stylus extension 6 at the chosen angular setting position. Fixture 20 is then set relative to a flat surface, for example horizontal surface 39 of a granite slab table, such that the central axis 3A of adapter plate 3 extends parallel to a surface plane defined by flat surface 39. To avoid deflection of stylus extension 6 from probe axis PA due to gravity, fixture 20 may be set on its side on flat surface 39 such that probe axis PA is substantially vertical as shown in FIGS. 8A and 8B.

Angular alignment of stylus extension 6 is now assessed by detecting a degree to which calibration axis CA is parallel to the surface plane of flat surface 39. As seen in FIGS. 8A and 8B, a dial indicator 41 placed against flat surface 39 may be used to check the degree to which calibration axis is parallel to the surface plane defined by flat surface 39. In particular, a contact point 43 on the plunger of dial indicator 41 is sequentially contacted with a first point at a distal end region of first lateral extension 35 (see FIG. 8A) and with a second point at a distal end region of second lateral extension 37 (see FIG. 8B). While contact point 43 is engaged with first lateral extension 35, the dial indicator detects a first distance from the surface plane of flat surface 39 to the top of the first lateral extension. Likewise, while contact point 43 is engaged with second lateral extension 35, the dial indicator detects a second distance from the surface plane of flat surface 39 to the top of the second lateral extension. Dial indicator 41 may be "zeroed" while contact point 43 is engaged with first lateral extension 35 by rotating the bezel of the dial indicator, whereby the dial indicator will directly indicate a difference between the first and second distances when contact point 43 is engaged with second lateral extension 37. If the first and second distances differ by more than a predetermined acceptable amount, the calibration axis CA is not sufficiently parallel to the surface plane of flat surface 39, and thus the angular alignment of stylus extension 6 is not yet acceptable. In that event, the steps of adjusting the angular position of the stylus extension 6 about central axis 3A while the adapter plate is mounted to fixture 20, setting fixture relative 20 to flat surface 39 such that central axis 3A extends parallel to the surface plane defined by flat surface 39, and detecting a degree to which the calibration axis CA is parallel to the surface plane are repeated until acceptable alignment is achieved. Once alignment is achieved, lateral extensions 35 and 37 may be uncoupled from the stylus assembly. Adapter plate 3 with the connected stylus assembly may then be removed from vice 9 and mounted on probe head 2. Alignment of stylus extension 6 may be verified by operating the CMM in accordance with the calibration methodology of the prior art, as described above with reference to FIGS. 1A and 1B.

In the method described above, two lateral extensions 35, 37 are used for defining the calibration axis CA. However, it is conceivable to define the calibration axis CA using only one lateral extension. In this case, contact point 43 of dial indicator 41 is sequentially contacted with at least two points spaced along the single lateral extension, for example at a proximal end region close to stylus extension 6 and at an opposite distal end region of the lateral extension, to check the degree to which calibration axis CA is parallel to the surface plane defined by flat surface 39.

Because the alignment of probe head 2 relative to table surface 1 is slightly different for each CMM due to manufacturer tolerances and installation settings, it is recommended to set up the probe head 2 of each CMM so that axial alignment of the stylus assembly performed remotely (i.e. off of the CMM) using fixture 20 will translate into proper alignment of the stylus assembly when adapter plate 3 and the connected stylus assembly are transferred from fixture 20 to the actual CMM probe head 2. To set up the probe head 2 of a CMM, an adapter plate 3 having a stylus assembly that has been aligned using fixture 20 is mounted on the CMM probe head 2, and an alignment check is carried out using a gauge pin 10 as described above in the Background of the Invention. If alignment is not within a desired tolerance, the probe head 2 of the CMM is adjusted and the alignment check is repeated until alignment within the desired tolerance is achieved. Once this initial set up has been performed, future stylus assembly alignments carried out remotely using fixture 20 will provide a properly aligned stylus assembly when the adapter plate 3 is transferred from the fixture 20 to the corresponding CMM probe head 2.

The present invention enables alignment calibration to be carried out in a much more efficient manner than the previous prior art calibration procedure, without occupying the CMM machine during the process. The adapter plate 3 may remain mounted to fixture 20 while adjustment screws 3C are loosened and re-tightened for alignment adjustment. Detecting a degree to which the calibration axis CA is parallel to the surface plane using a dial indicator requires minimal skill. In fact, pre-alignment may be performed by someone who is not skilled in operating the CMM, while the CMM is operated by a skilled operator to perform an actual coordinate measuring task.

While the invention has been described in connection with exemplary embodiments, the detailed description is not intended to limit the scope of the invention to the particular forms set forth. The invention is intended to cover such alternatives, modifications and equivalents of the described embodiment as may be included within the scope of the invention.

What is claimed is:

1. A method of angularly aligning a stylus extension relative to an adapter plate configured to mount onto a probe head of a coordinate measurement machine, the stylus extension being connected to the adapter plate such that the stylus extension extends along a probe axis that is perpendicular to a central axis of the adapter plate, the method comprising the steps of:
   A) providing a fixture separate from the probe head,
   B) mounting the adapter plate to the fixture;
   C) connecting at least one lateral extension to the stylus extension such that the lateral extension extends in a lateral direction from the stylus extension along a calibration axis perpendicular to the probe axis and the central axis;
   D) adjusting the angular position of the stylus extension about the central axis of the adapter plate while the adapter plate is mounted to the fixture;
   E) setting the fixture relative to a flat surface such that the central axis extends parallel to a surface plane defined by the flat surface;
   F) detecting a degree to which the calibration axis is parallel to the surface plane; and
   G) repeating steps (D) through (F) if the calibration axis is not parallel to the surface plane within acceptable limits.

2. The method according to claim 1, wherein the step of mounting the adapter plate on the fixture includes clamping the adapter plate to the fixture.

3. The method according to claim 1, wherein the step of adjusting the angular position of the stylus extension includes (i) loosening the plurality of adjustment screws of the adapter plate, (ii) rotating the stylus extension about the central axis to an angular setting position, and (iii) tightening the plurality of adjustment screws to fix the stylus extension at the angular setting position, wherein the plurality of adjustment screws are loosened and tightened while the adapter plate is mounted to the fixture.

4. The method according to claim 1, wherein the step of detecting a degree to which the calibration axis is parallel to the surface plane is performed using a dial indicator placed against the flat surface, wherein a contact point of the dial indicator is sequentially contacted with at least two points spaced along the at least one lateral extension.

5. The method according to claim 4, wherein the at least one lateral extension includes a first lateral extension and a second lateral extension connected to the stylus extension such that the first and second lateral extensions extend in opposite lateral directions from the stylus extension along the calibration axis perpendicular to the probe axis and the central axis.

6. The method according to claim 5, wherein the contact point of the dial indicator is sequentially contacted with a first point at a distal end region of the first lateral extension and with a second point at a distal end region of the second lateral extension.

7. The method according to claim 1, wherein the flat surface is horizontal and the probe axis is substantially vertical when the fixture is set relative to the flat surface.

8. A fixture for use in angularly aligning a stylus extension relative to an adapter plate configured to mount onto a probe head of a coordinate measurement machine, wherein the adapter plate has a central axis and a plurality of mounting elements angularly spaced about the central axis, the fixture comprising:
   a front mounting surface, a rear clamping surface opposite from the front mounting surface, and a front clamping surface in a plane parallel to the front mounting surface, wherein the front clamping surface is offset from the front mounting surface by an axial step distance corresponding to an axial thickness of the adapter plate;
   wherein the fixture includes an access hole extending through the fixture from the front mounting surface to the rear clamping surface, and a plurality of angularly spaced mounting features in the front mounting surface for respectively receiving the mounting elements of the adapter plate;
   whereby the adapter plate is mountable against the front mounting surface of the fixture such that the central axis of the adapter plate extends through the access hole.

9. The fixture according to claim 8, wherein the fixture is a one-piece body.

10. The fixture according to claim 8, wherein the plurality of angularly spaced mounting features are radially extending V-shaped grooves.

11. An alignment calibration apparatus for use in angularly aligning a stylus extension relative to an adapter plate configured to mount onto a probe head of a coordinate measurement machine, wherein the adapter plate has a central axis and a plurality of mounting elements angularly spaced about the central axis, the apparatus comprising:
   a fixture comprising a front mounting surface, a rear clamping surface opposite from the front mounting surface, and a front clamping surface in a plane parallel to the front mounting surface, wherein the front clamping surface is offset from the front mounting surface by an axial step distance corresponding to an axial thickness of the adapter plate, wherein the fixture includes an access hole extending through the fixture from the front mounting surface to the rear clamping surface and a plurality of angularly spaced mounting features in the front mounting surface for respectively receiving the mounting elements of the adapter plate, whereby the adapter plate is mountable against the front mounting surface of the fixture such that the central axis of the adapter plate extends through the hole; and
   a vice operable to clamp the adapter plate against the front mounting surface of the fixture, wherein the vice includes a front jaw for engaging the adapter plate and the front clamping surface of the fixture and a rear jaw for engaging the rear clamping surface of the fixture, wherein the rear jaw of the vice is configured to leave the access hole of the fixture substantially unblocked when the fixture and the adapter plate are clamped in the vice;

whereby a plurality of adjustment screws of the adapter plate are accessible and adjustable through the access hole while the fixture and the adapter plate are clamped in the vice.

12. The apparatus according to claim 11, wherein the fixture is a one-piece body.

13. The apparatus according to claim 11, wherein the plurality of angularly spaced mounting features are radially extending V-shaped grooves.

* * * * *